United States Patent
Ahn et al.

(10) Patent No.: US 11,186,484 B2
(45) Date of Patent: Nov. 30, 2021

(54) METHOD OF PURIFYING BORON NITRIDE NANOTUBES

(71) Applicant: KOREA INSTITUTE OF SCIENCE AND TECHNOLOGY, Seoul (KR)

(72) Inventors: Seokhoon Ahn, Seoul (KR); Se Gyu Jang, Seoul (KR); Myung Jong Kim, Seoul (KR); Hun-Su Lee, Seoul (KR); Soul-Hee Lee, Seoul (KR); Min Sung Kang, Seoul (KR); Sangseok Lee, Seoul (KR); Yongho Joo, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/844,213

(22) Filed: Apr. 9, 2020

(65) Prior Publication Data
US 2021/0114875 A1    Apr. 22, 2021

(30) Foreign Application Priority Data
Oct. 21, 2019  (KR) .................. 10-2019-0130707

(51) Int. Cl.
*C01B 21/064* (2006.01)

(52) U.S. Cl.
CPC ...... *C01B 21/0648* (2013.01); *C01P 2004/13* (2013.01); *C01P 2006/80* (2013.01)

(58) Field of Classification Search
None
See application file for complete search history.

(56) References Cited

U.S. PATENT DOCUMENTS

| 2016/0145101 | A1 | 5/2016 | Culha |
| 2019/0039958 | A1* | 2/2019 | Shahsavari ......... C04B 41/5079 |
| 2020/0055732 | A1 | 2/2020 | Dushatinski et al. |

FOREIGN PATENT DOCUMENTS

| JP | 2007-230830 A | 9/2007 |
| JP | 4670100 B2 | 1/2011 |
| KR | 10-1429559 B1 | 8/2014 |
| KR | 10-2019-0017144 A | 2/2019 |
| KR | 10-2019-008749 A | 7/2019 |
| WO | WO-2019079882 A1 * | 5/2019 ............. C03C 25/16 |

OTHER PUBLICATIONS

Dukeun Kim et al., Hydrolytic Unzipping of Boron Nitride Nanotubes in Nitric Acid, Nanoscale Research Letters, Feb. 7, 2017, pp. 1-5, Springer Open.
Keun Su Kim et al., Polymer nanocomposites from free-standing, macroscopic boron nitride nanotube assemblies, RSC Advances, Apr. 30, 2015, pp. 41186-41192, 2015, 5.

* cited by examiner

*Primary Examiner* — Guinever S Gregorio
(74) *Attorney, Agent, or Firm* — Goldilocks Zone IP Law (57) ABSTRACT

Disclosed is a method of purifying boron nitride nanotubes through a simplified process. Specifically, the method includes preparing a starting solution containing boron nitride nanotubes (BNNTs), a dispersant and a solvent, centrifuging the starting solution or allowing the starting solution to stand to collect a supernatant, adding an acid to the supernatant and filtering a resulting product.

8 Claims, 9 Drawing Sheets

METHOD OF PURIFYING BORON NITRIDE NANOTUBES

CROSS-REFERENCE TO RELATED APPLICATION

This application claims, under 35 U.S.C. § 119(a), the benefit of priority to Korean Patent Application No. 10-2019-0130707 filed on Oct. 21, 2019, the entire contents of which are incorporated herein by reference.

BACKGROUND

(a) Technical Field

The present invention relates to a method of purifying boron nitride nanotubes through a simplified process.

(b) Background Art

Carbon nanotubes (CNTs), which have excellent mechanical, thermal and electrical properties, have been extensively researched over the past 20 years and applied to various fields. However, the usage thereof is limited when electrical insulation is required or when exposed to high-temperature or oxidative environments.

Recently, as an alternative to solve the above problems of carbon nanotubes, boron nitride nanotubes (BNNTs) have attracted attention. Boron nitride nanotubes (BNNTs) are structural analogs of carbon nanotubes wherein carbon atoms of carbon nanotubes (CNTs) are replaced with boron atoms and nitrogen atoms.

Due to the structural similarity thereof to carbon nanotubes (CNTs), boron nitride nanotubes (BNNTs) have properties similar to those of carbon nanotubes (CNTs), i.e., low density, high mechanical strength and high thermal conductivity. In addition, boron nitride nanotubes (BNNTs) have a wide band gap, unlike carbon nanotubes (CNTs), and thus have semiconductor or nonconductor properties. In addition, boron nitride nanotubes (BNNTs) have excellent chemical resistance and oxidation resistance due to high bonding stability between nitrogen and boron, and thus can be used even in harsh environments.

However, the unique characteristics of boron nitride nanotubes (BNNTs) are readily deteriorated due to impurities generated during the synthesis thereof. The impurities include boron, amorphous-boron nitride (a-BN), hexagonal boron nitride (h-BN) and the like, all of which typically have a size ranging from a few micrometers (μm) to several tens of nanometers (nm), which may vary depending on the manufacturing process. The impurities cause various problems such as disturbing the dispersion of boron nitride nanotubes (BNNTs) in the solvent, reducing the surface area, lowering the strength and inhibiting composite formation. In particular, impurities such as amorphous boron nitride or hexagonal boron nitride have chemical properties similar to those of boron nitride nanotubes (BNNTs), and thus are difficult to remove selectively. A method of functionalizing boron nitride nanotubes (BNNTs) with a polymer via a non-covalent bond and purifying the same through centrifugation has been reported, but this method also has a disadvantage of difficulty in removing the polymer after purification.

The above information disclosed in this Background section is provided only for enhancement of understanding of the background of the invention, and therefore it may include information that does not form the prior art that is already known in this country to a person of ordinary skill in the art.

SUMMARY OF THE DISCLOSURE

The present invention has been made in an effort to solve the above-described problems associated with the prior art.

It is one object of the present invention to provide a method of purifying boron nitride nanotubes capable of removing impurities generated during the synthesis of is boron nitride nanotubes through a simplified process.

It is another object of the present invention to provide a method of purifying boron nitride nanotubes capable of improving production efficiency of boron nitride nanotubes by removing impurities within a short time.

The aforementioned objects of the present invention as well as other objects will be clearly understood from the following description and could be implemented by means defined in the claims and combinations thereof.

In one aspect, the present invention provides a method of purifying boron nitride nanotubes including preparing a starting solution containing boron nitride nanotubes (BNNTs), a dispersant and a solvent, centrifuging the starting solution or allowing the starting solution to stand to collect a supernatant, adding an acid to the supernatant and filtering a resulting product.

The boron nitride nanotubes of the starting solution may be in an as-synthesized state.

The boron nitride nanotubes of the starting solution may be preheated to a temperature of 600° C. to 900° C.

The dispersant may include a heterocyclic compound containing a nitrogen element.

The dispersant may include one selected from the group consisting of a pyrrole polymer, a pyridine polymer and combinations thereof.

The solvent may include an alcohol solvent.

The dispersant may bind to the boron nitride nanotubes (BNNTs) to functionalize the boron nitride nanotubes (BNNTs) and to disperse the functionalized boron nitride nanotubes (BNNTs) in the solvent.

The starting solution may be centrifuged at 3,000 RPM to 30,000 RPM for 30 seconds to 20 minutes.

The starting solution may be centrifuged at least two times.

The acid may include one selected from the group consisting of hydrochloric acid, sulfuric acid, nitric acid, alkyl sulfonic acid and combinations thereof.

The acid may bind to the dispersant of the boron nitride nanotubes functionalized with the dispersant to separate the dispersant from the boron nitride nanotubes (BNNTs) and to precipitate the boron nitride nanotubes (BNNTs).

The acid may bind to a boron compound having a particle diameter of 30 nm to 500 nm as an impurity to separate the boron compound from the boron nitride nanotubes.

The filtering may simultaneously remove the dispersant bound to the acid and the impurity bound to the acid.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

The objects described above, and other objects, features and advantages will be clearly understood from the following preferred embodiments with reference to the attached drawings. However, the present invention is not limited to the embodiments, and will be embodied in different forms. The embodiments are suggested only to offer thorough and complete understanding of the disclosed context and sufficiently inform those skilled in the art of the technical concept of the present invention.

Like reference numbers refer to like elements throughout the description of the figures. In the drawings, the sizes of structures are exaggerated for clarity.

It will be further understood that the term "comprises" or "has", when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should modify all the numbers, figures and/or expressions. In addition, when numerical ranges are disclosed in the description, these ranges are continuous and include all numbers from the minimum to the maximum including the maximum within the ranges unless otherwise defined. Furthermore, when the range refers to an integer, it includes all integers from the minimum to the maximum including the maximum within the range, unless otherwise defined.

Figure 1:
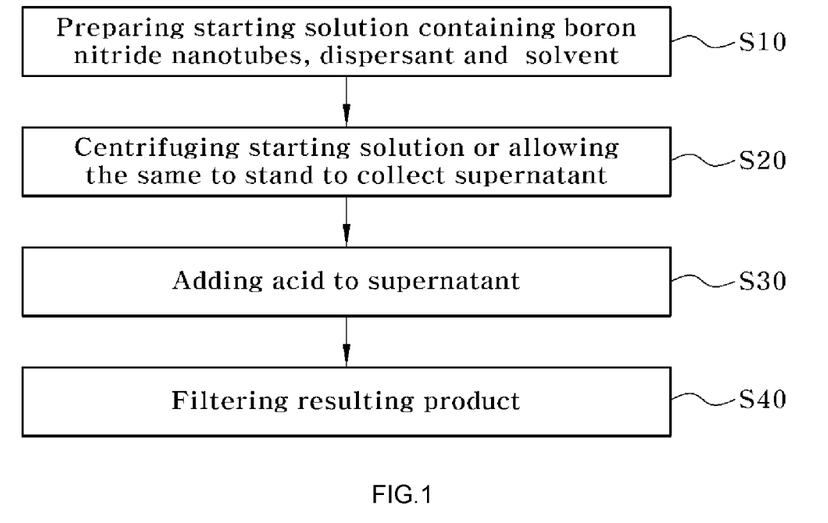
FIG. 1 is a flow chart schematically showing a method of purifying boron nitride nanotubes according to the present invention.

FIG. 1 is a flow chart schematically showing a method of purifying boron nitride nanotubes according to the present invention. Referring to FIG. 1, the purification method includes preparing a starting solution containing boron nitride nanotubes (BNNTs), a dispersant and a solvent (S10), centrifuging the starting solution or allowing it to stand to collect a supernatant (S20), adding an acid to the supernatant (S30), and filtering the resulting product (S40).

The boron nitride nanotubes (BNNTs) in the starting solution may be as synthesized. Here, "as synthesized" means that boron nitride nanotubes that are synthesized are not subjected to a separate treatment, process or the like. For example, the boron nitride nanotubes (BNNTs) may be synthesized by arc discharge, laser cutting, ball milling, alternative chemical reaction, chemical vapor deposition or the like. The boron nanotubes (BNNTs) synthesized by the method described above can be used without any treatment.

The as-synthesized boron nitride nanotubes (as-synthesized BNNTs) are generally present in about 50% by weight of a bulk material, and contain impurities such as boron, amorphous boron nitride (a-BN) and hexagonal boron nitride (h-BN). The impurities may have a size of several micrometers (μm) to several tens of nanometers (nm), and, for example, the particle diameter thereof may be 30 nm to 500 nm.

The boron nitride nanotubes (BNNTs) of the starting solution may be is preheated to a predetermined temperature. Specifically, the as-synthesized boron nitride nanotubes (as-synthesized BNNTs) may be preheated to a temperature of 600° C. to 900° C. As a result, boron remaining in the as-synthesized BNNTs is oxidized and the boron compound can be removed by dissolving the same in a water or alcohol solvent.

The dispersant may include a heterocyclic compound containing a nitrogen element. The dispersant is a component that binds to boron nitride nanotubes (BNNTs) to functionalize the boron nitride nanotubes (BNNTs), and the functionalized boron nitride nanotubes (functionalized BNNTs) are dispersed in the solvent.

Figure 2:
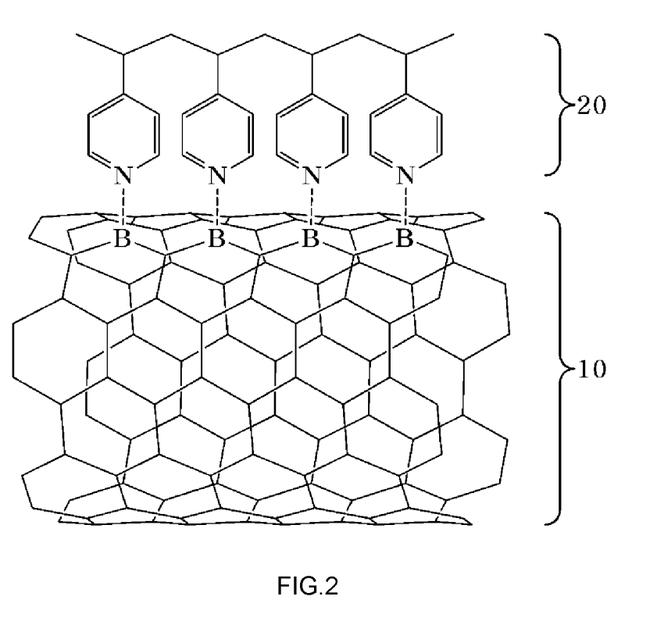
FIG. 2 is a reference diagram schematically showing boron nitride nanotubes functionalized with a dispersant.

FIG. 2 is a reference diagram schematically showing the functionalized boron nitride nanotubes (functionalized BNNTs). Specifically, FIG. 2 shows that the boron nitride nanotubes 10 are functionalized by interaction between the boron element (B) and the nitrogen element (N) of the dispersant 20. Here, the term "binding" the boron nitride nanotubes 10 to the dispersant 20 or causing the boron nitride nanotubes to "interact" with the dispersant 20 does not mean linkage between the two components via a strong chemical bond such as a covalent bond, but rather via pi-pi interaction (π-π interaction), electrostatic interaction and Van der Waals interaction.

The dispersant may include one selected from the group consisting of a pyrrole polymer, a pyridine polymer and combinations thereof.

The pyrrole polymer may be, for example, polypyrrole or the like. The pyridine is polymer may be poly(2-vinylpyridine), poly(4-vinylpyridine) or the like.

The amount of the dispersant added is not particularly limited. For example, the dispersant may be added in an appropriate amount enabling the boron nitride nanotubes (BNNTs) to be dispersed in the solvent.

The solvent may be an alcohol solvent selected, for example, from the group consisting of methanol, ethanol, n-propanol, isopropanol, n-butanol, 2-butanol, isobutanol, methoxy methanol, ethoxy methanol, methoxy propanol, ethoxy propanol, diacetone alcohol and combinations thereof.

The boron nitride nanotubes (BNNTs) are functionalized by the dispersant so that the dispersibility thereof can be greatly increased in an alcohol solvent. Therefore, the boron nitride nanotubes (BNNTs) neither precipitate nor sink, and remain dispersed in the alcohol solvent.

The starting solution may be centrifuged or allowed to stand to precipitate impurities, making it possible to collect only the supernatant containing boron nitride nanotubes (BNNTs) (S20). When the starting solution is centrifuged or allowed to stand for a long time, impurities having a large size are precipitated and thus can be easily removed.

The centrifugation conditions are not particularly limited, but may for example be 3,000 RPM to 30,000 RPM for 30 seconds to 20 minutes.

In addition, centrifugation may be performed at least two times. Centrifugation may be performed multiple times, for example, by removing the precipitate through primary centrifugation, collecting the supernatant, removing the precipitate again through secondary centrifugation and collecting the supernatant.

After collecting the supernatant, an acid may be added thereto to separate small-sized impurities and the dispersant from the boron nitride nanotubes (BNNTs) (S30).

Figure 3:
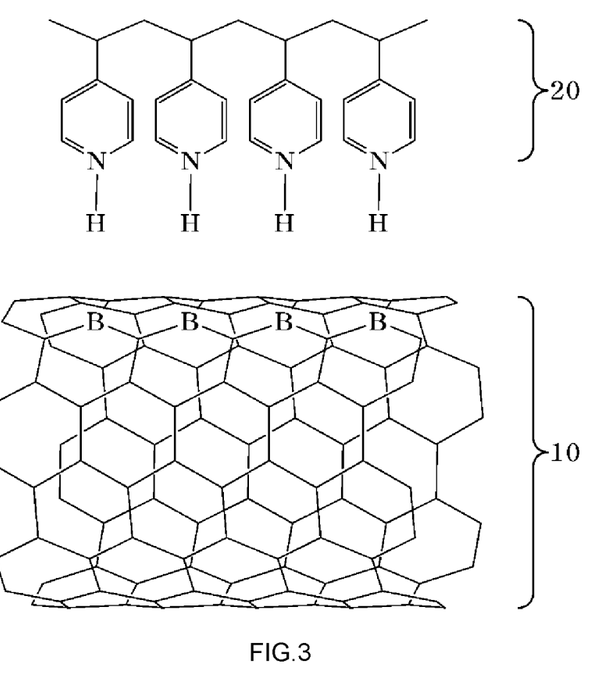
FIG. 3 is a reference diagram illustrating the reaction between the boron nitride nanotubes, the dispersant and an acid when the acid is added to a supernatant obtained through centrifugation.

FIG. 3 is a reference diagram illustrating the reaction between the boron nitride nanotubes 10, the dispersant 20 and the acid when the acid is added to the supernatant. Referring to FIG. 3, a proton derived from the acid forms a strong ionic bond with the nitrogen element (N) of the dispersant 20. Therefore, the dispersant 20 is separated from the boron nitride nanotubes 10, the dispersibility of the boron nitride nanotubes 10 in the solvent is decreased and the boron nitride nanotubes 10 are precipitated.

When filtration is performed without removing the dispersant, the boron nitride nanotubes uniformly dispersed by the dispersant accumulate on a filtration membrane. Therefore, filtration is not performed well and the filtration time is very long. In addition, since the dispersant is present in the purified boron nitride nanotubes, an additional process of removing the same by heat treatment should be performed. The present invention does not cause the above problem because the dispersant as well as impurities to be described later can be removed through the is acid treatment.

In addition, the acid reacts with boron compounds such as amorphous boron nitride (a-BN) and hexagonal boron nitride (h-BN), which are small-sized impurities. Specifically, an amine group present at the end of the boron compound is ionically bonded to a cation (proton) derived from the acid. As a result, the dispersibility of the impurities in the alcohol solvent is increased, and the impurities are separated from the boron nitride nanotubes (BNNTs) and remain dispersed in the alcohol solvent.

The particle diameter of the impurities is not particularly limited, but may be, for example, 30 nm to 500 nm. As described above, it is difficult to separate nano-sized impurities through the above-described centrifugation, but the present invention is characterized in that nano-sized impurities are easily removed by adding the acid to the supernatant collected after centrifugation.

The acid is not particularly limited, but may include, for example, one selected from the group consisting of hydrochloric acid, sulfuric acid, nitric acid, alkyl sulfonic acid and combinations thereof. The alkyl sulfonic acid may be an alkyl sulfonic acid having an alkyl group having 1 to 16 carbon atoms, for example, methane sulfonic acid.

As described above, boron nitride nanotubes (BNNTs) remain precipitated or settled in the acid-treated product, and the dispersant and impurities react with the is acid and thus remain separated from the boron nitride nanotubes (BNNTs).

The resulting product may be filtered to purify only the boron nitride nanotubes (BNNTs) (S40). Specifically, through filtering the resulting acid-treated product, the dispersant and acid-bound impurities bound to the acid can be simultaneously removed and thus purified boron nitride nanotubes (purified BNNTs) can be obtained.

Since the boron nitride nanotubes (BNNTs) are precipitated while being separated from the dispersant and impurities, the time required for filtration is greatly shortened. Thus, the present invention can greatly reduce the process time required for the boron nitride purification method. In addition, since the dispersant and impurities are removed together, there is no need to perform an additional process of separating the dispersant, and the boron nitride purification process can thus be simplified.

EXAMPLE

Hereinafter, the present invention will be described in more detail with reference to specific examples. However, these examples are provided only for illustration of the present invention and should not be construed as limiting the scope of the present invention.

1. Preparation of Starting Solution

Figure 4:
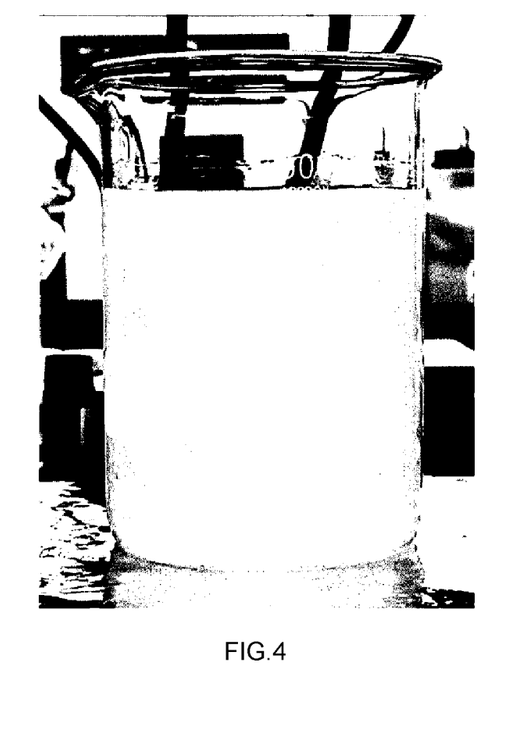
FIG. 4 is an image showing the starting solution prepared in Example described later.

As-synthesized boron nitride nanotubes (BNNTs) were heat-treated at about 600° C. to oxidize the remaining boron, which was removed by dissolving in a water or alcohol solvent. The boron nitride nanotubes (BNNTs) were mixed with a dispersant and an alcohol solvent to prepare a starting solution. Poly(4-vinylpyridine) was used as the dispersant. FIG. 4 is an image showing the starting solution thus prepared. As can be seen from FIG. 4, the boron nitride nanotubes (BNNTs) were dispersed in the solvent and appeared cloudy. The reason for this is that the dispersant interacts with the boron nitride nanotubes (BNNTs) to improve the dispersibility of the boron nitride nanotubes (BNNTs) in the alcohol solvent.

2. Collection of Supernatant

Figure 5A:
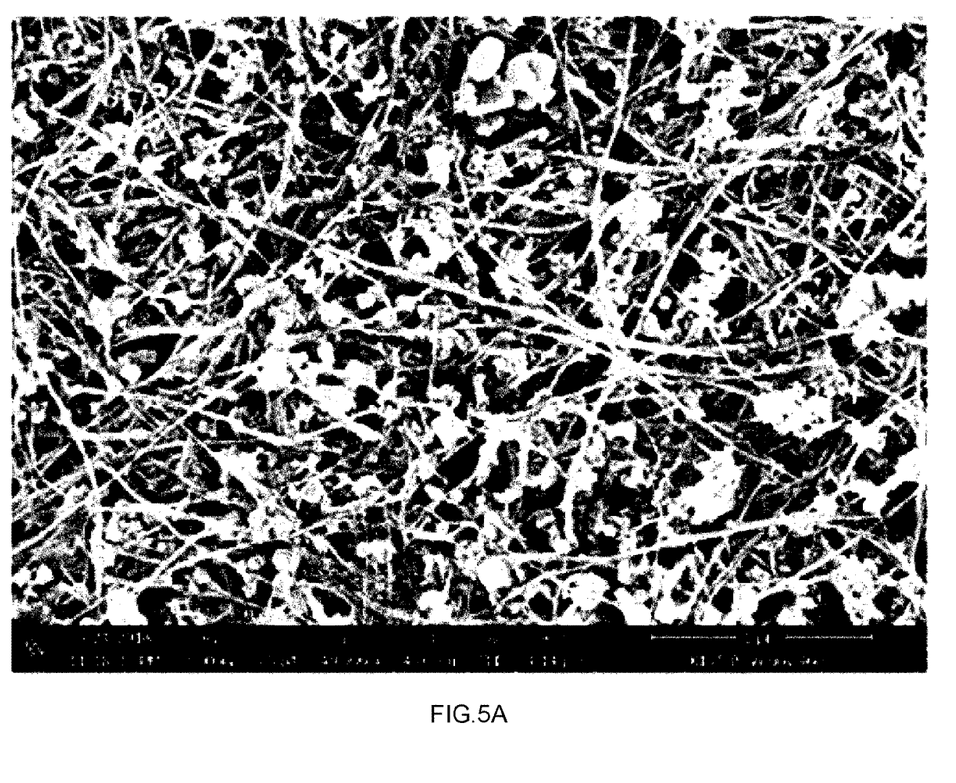
FIG. 5A shows the result of scanning electron microscopy of a supernatant of a sample primarily centrifuged in Example described later.
Figure 5B:
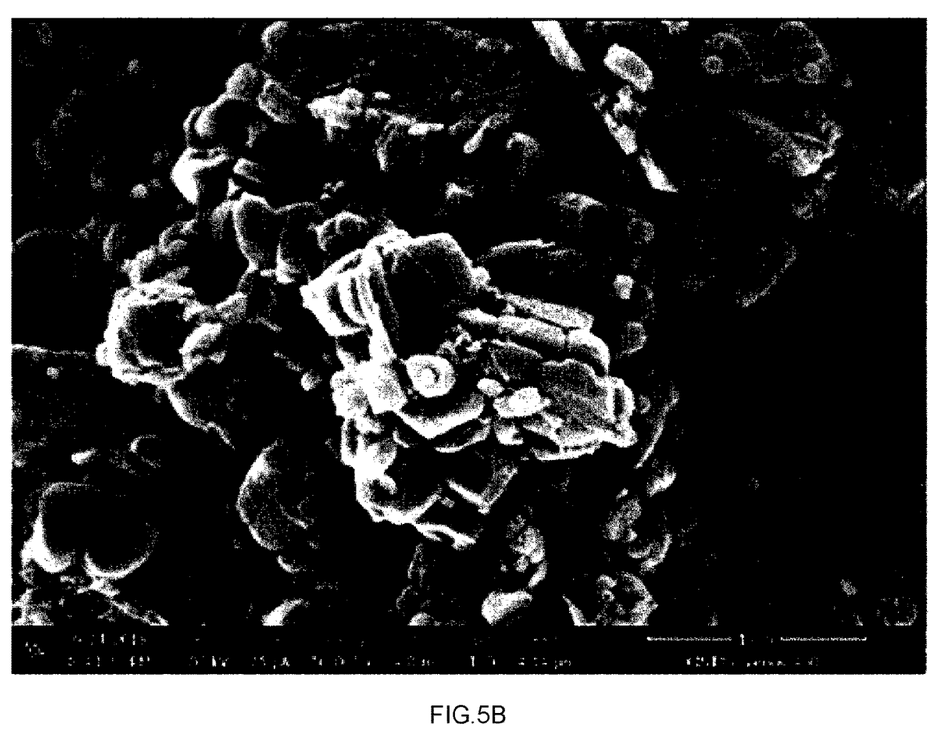
FIG. 5B shows the result of scanning electron microscopy of a precipitate of the sample primarily centrifuged in Example described later.

The starting solution was centrifuged a total of three times, and the supernatant was collected. Specifically, the starting solution was primarily centrifuged at about 10,000 RPM for about 1 minute. FIG. 5A shows the result of scanning electron microscopy of the supernatant of the primarily centrifuged sample, and FIG. 5B shows the result of scanning electron microscopy of the precipitate of the primarily centrifuged sample. As can be seen from FIGS. 5A and 5B, the supernatant contains boron nitride nanotubes (BNNTs) and small impurities, and the precipitate contains large impurities.

Then, the supernatant of the primarily centrifuged sample was secondarily centrifuged at about 10,000 RPM for about 10 minutes. The supernatant was collected again and then was tertiarily centrifuged at about 10,000 RPM for about 10 minutes, and the supernatant was collected again.

Figure 6:
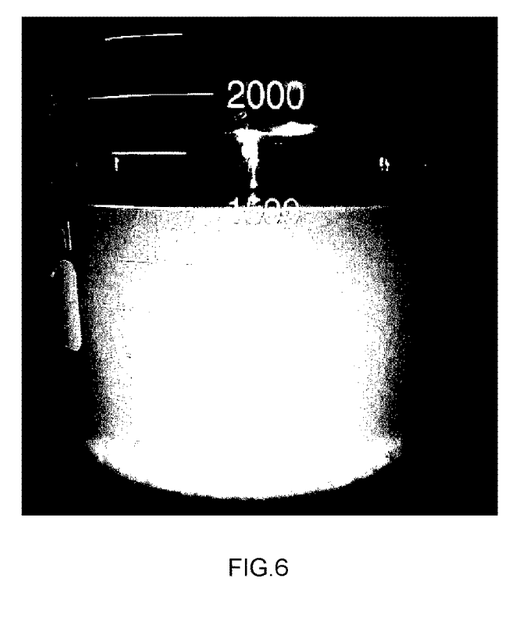
FIG. 6 is an image showing a starting solution after being allowed to stand in Example described later.

For reference, the starting solution may be allowed to stand for a long time to precipitate impurities without centrifugation and the supernatant may be collected. FIG. 6 is an image showing the starting solution after being allowed to stand for a long time.

3. Addition of Acid

Figure 7A:
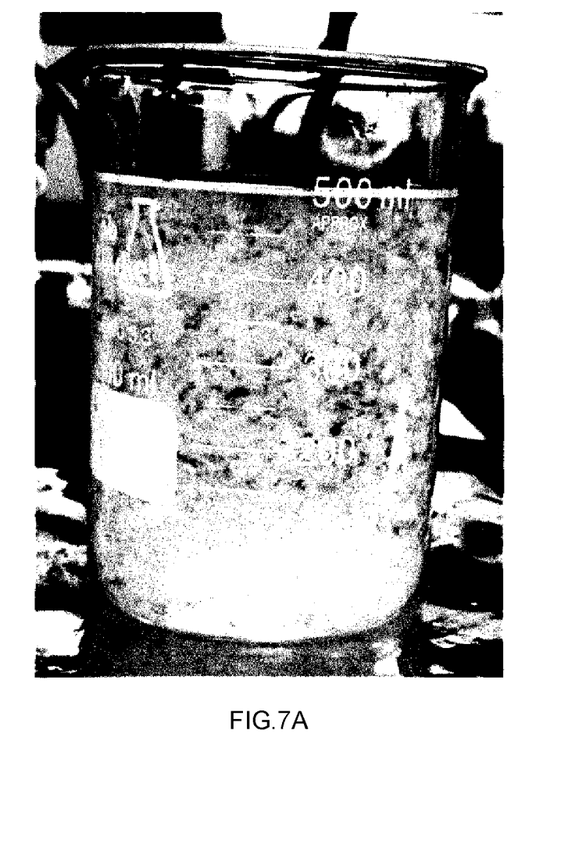
FIG. 7A is an image showing precipitation of boron nitride nanotubes through addition of an acid and FIG. 7B is an image showing that no change occurs at a predetermined time after the precipitation of FIG. 7A.
Figure 7B:
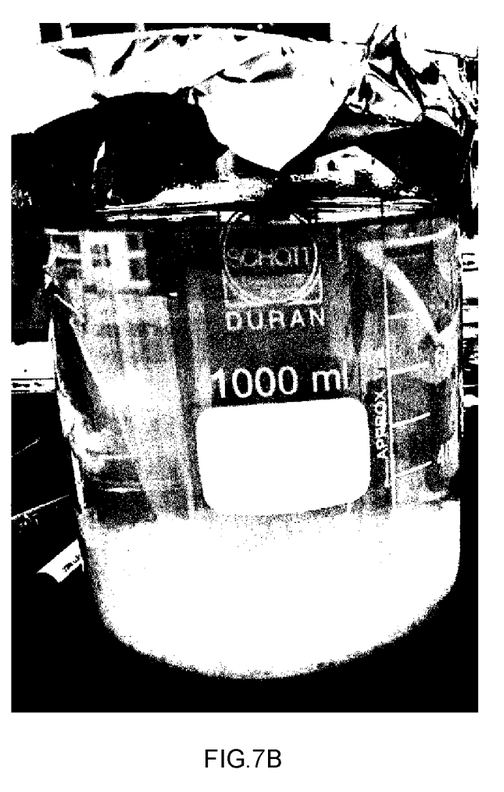

An acid was added to the supernatant obtained as above. The acid used herein was methane sulfonic acid. FIG. 7A is an image showing precipitation of boron nitride nanotubes (BNNTs) through addition of an acid, and FIG. 7B is an image showing that no change occurs after a predetermined time. As can be seen from FIG. 7B, the acid binds to the dispersant so that the dispersant is separated from the boron nitride nanotubes (BNNTs) and thus the boron nitride nanotubes (BNNTs) are precipitated. The reason for this is that the dispersibility of the boron nitride nanotubes (BNNTs) in the solvent as described above is deteriorated.

Figure 8:
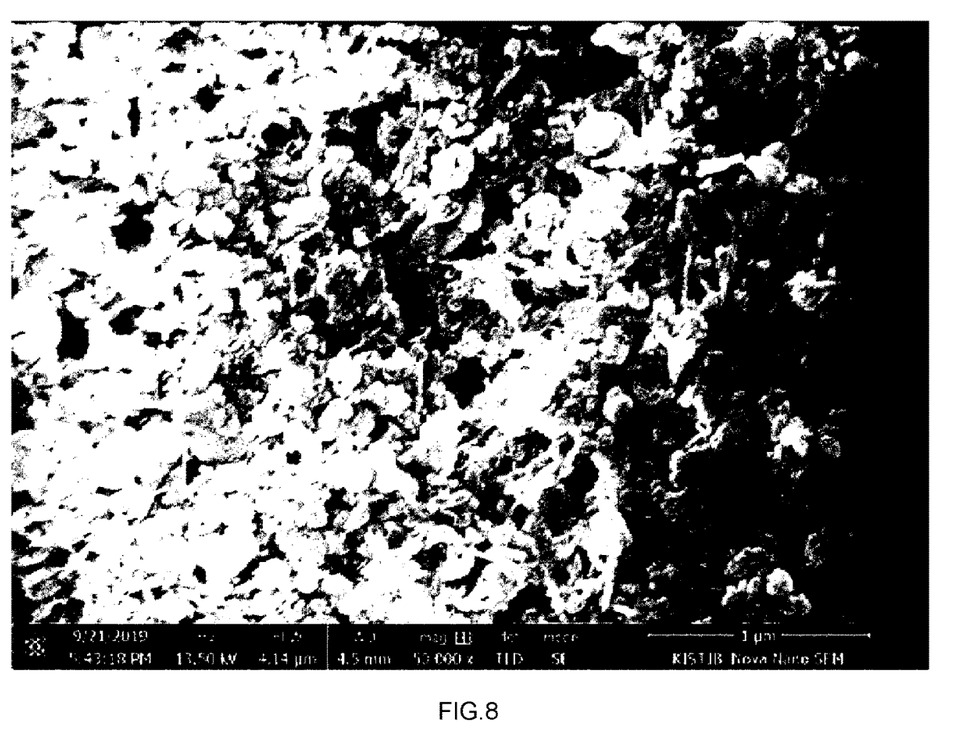
FIG. 8 shows the result of scanning electron microscopy of the supernatant of FIG. 7B.

FIG. 8 shows the result of scanning electron microscopy of the supernatant of FIG. 7B. As can be seen from FIG. 8, there was almost no tubular material and impurities in the form of particles occupy most of the material, which means that the impurities can be separated from boron nitride nanotubes (BNNTs) by adding an acid thereto.

4. Filtration

Figure 9A:
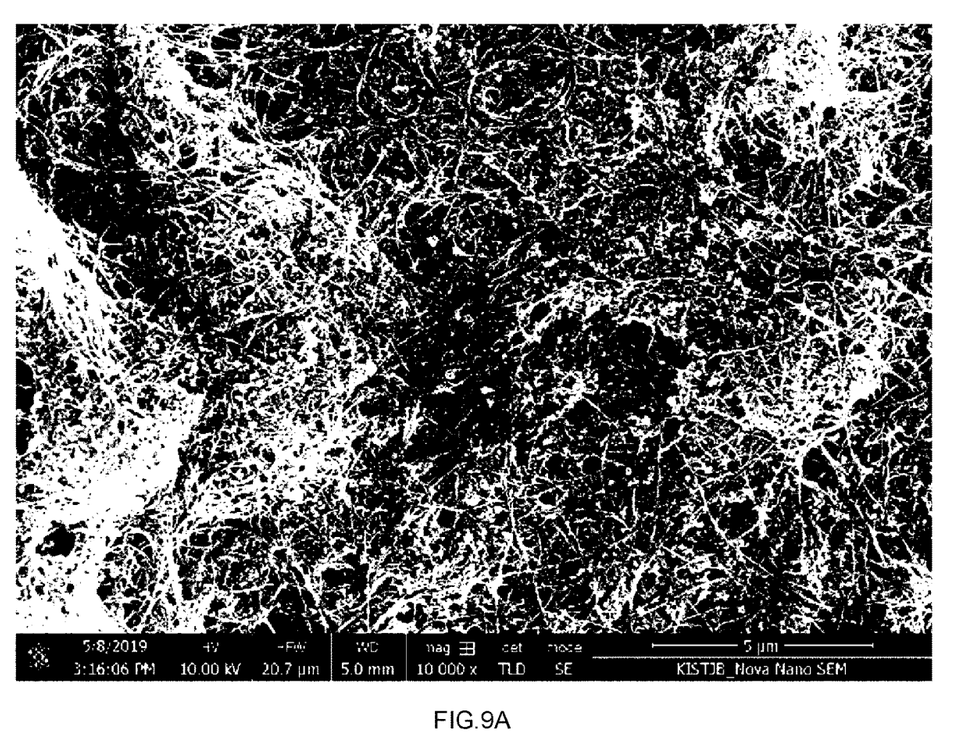
FIG. 9A shows the result of scanning electron microscopy of purified boron nitride nanotubes and FIG. 9B shows the result of scanning electron microscopy of as-synthesized boron nitride nanotubes.
Figure 9B:
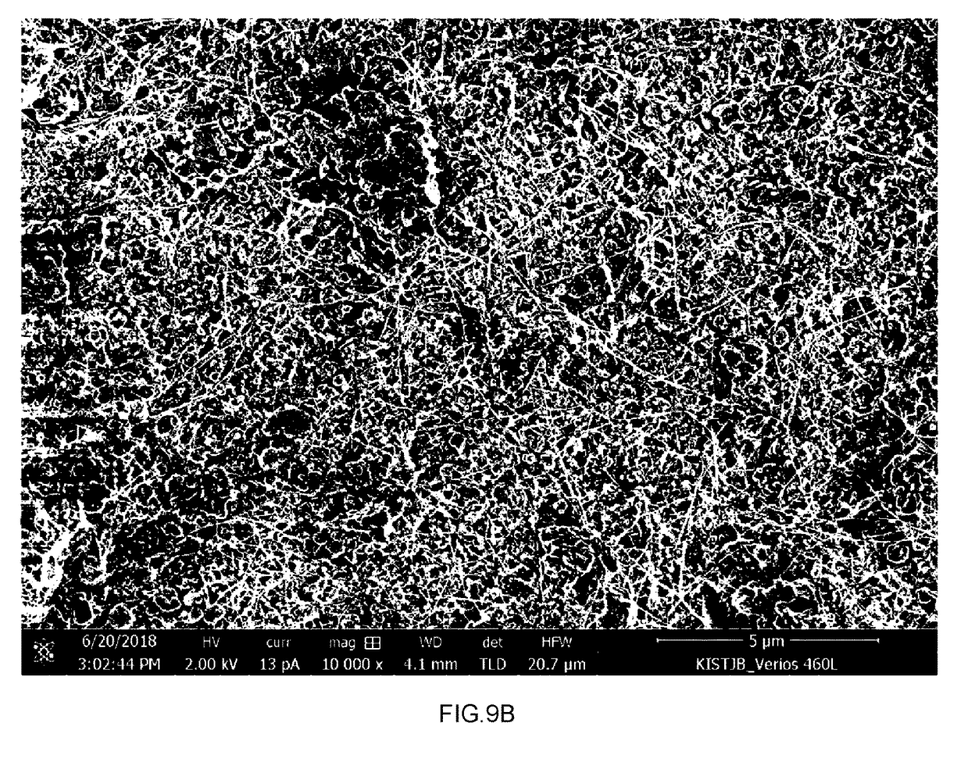

Finally, the resulting acid-treated product was filtered to obtain purified boron nitride nanotubes (BNNTs). FIG. 9A shows the result of scanning electron microscopy of purified boron nitride nanotubes (purified BNNTs). For reference, scanning electron microscopy was performed on the as-synthesized BNNTs used in the preparation of the starting solution, and the result is shown in FIG. 9B. The impurities remain agglomerated in various places in FIG. 9B, whereas only boron nitride nanotubes (BNNTs) are found in FIG. 9A.

As is apparent from the foregoing, the present invention is capable of purifying boron nitride nanotubes within a short time through a simplified process, thus greatly contributing to securing the price competitiveness of boron nitride nanotubes and greatly improving productivity.

The effects of the present invention are not limited to those mentioned above. It should be understood that the effects of the present invention include all effects that can be inferred from the description of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of purifying boron nitride nanotubes comprising:
    preparing a starting solution containing boron nitride nanotubes (BNNTs), a dispersant and a solvent, wherein the dispersant binds to the BNNTs to functionalize the BNNTs;
    centrifuging the starting solution or allowing the starting solution to stand to collect a supernatant containing functionalized BNNTs;
    adding an acid to the supernatant, wherein the acid binds to the dispersant of the functionalized BNNTs to separate the dispersant from the BNNTs, and the acid binds to a boron compound as an impurity to separate the boron compound from the BNNTs; and
    filtering the supernatant from the BNNTs to simultaneously remove the dispersant bound to the acid and the impurity bound to the acid,
    wherein the dispersant comprises one selected from the group consisting of a pyrrole polymer, a pyridine polymer and combinations thereof.

2. The method according to claim 1, wherein the boron nitride nanotubes of the starting solution are in a synthesized state.

3. The method according to claim 1, wherein the boron nitride nanotubes are preheated in the starting solution to a temperature of 600° C. to 900° C.

4. The method according to claim 1, wherein the solvent comprises an alcohol solvent.

5. The method according to claim 1, wherein the starting solution is centrifuged at 3,000 RPM to 30,000 RPM for 30 seconds to 15 minutes.

6. The method according to claim 1, wherein the starting solution is centrifuged at least two times.

7. The method according to claim 1, wherein the acid comprises one selected from the group consisting of hydrochloric acid, sulfuric acid, nitric acid, alkyl sulfonic acid and combinations thereof.

8. The method according to claim 1, wherein the acid binds to the boron compound having a particle diameter of 30 nm to 500 nm as an impurity to separate the boron compound from the boron nitride nanotubes.

* * * * *